United States Patent [19]

Moore et al.

[11] Patent Number: 5,117,101
[45] Date of Patent: May 26, 1992

[54] TRISTIMULUS COLOR RECOGNITION SYSTEM WITH MEANS FOR COMPENSATING FOR VARIATIONS IN LIGHT SOURCE COLOR

[75] Inventors: Richard D. Moore, Akron; Richard K. Peters; Donald V. Elmerick, both of Tallmadge, all of Ohio

[73] Assignee: Technostics Corporation, Hampton, Iowa

[21] Appl. No.: 567,015

[22] Filed: Aug. 13, 1990

[51] Int. Cl.⁵ .............................. G01J 3/50; H05J 5/16
[52] U.S. Cl. .............................. 250/226; 250/227.23; 356/405
[58] Field of Search .............. 250/226, 227.11, 227.23; 356/402, 405, 406, 407, 416, 419, 425; 209/580, 581, 582

[56] References Cited

U.S. PATENT DOCUMENTS

| | | |
|---|---|---|
| 3,463,595 | 8/1969 | Blanc et al. |
| 3,473,878 | 10/1969 | Schweitzer |
| 3,500,054 | 3/1970 | Lasalle et al. |
| 3,707,030 | 12/1972 | Hunter et al. |
| 3,758,784 | 9/1973 | Vischaulis .............. 250/227.11 |
| 3,804,531 | 4/1974 | Kosaka et al. |
| 3,806,256 | 4/1974 | Ishak |
| 3,935,436 | 1/1976 | Holschlag |
| 3,970,394 | 7/1976 | Stanton .............. 250/227.23 |
| 4,029,419 | 6/1977 | Schumann, Jr. et al. |
| 4,076,421 | 2/1978 | Kishner |
| 4,131,367 | 12/1978 | French et al. .............. 356/405 |
| 4,278,538 | 7/1981 | Lawrence et al. .............. 209/581 |
| 4,402,611 | 9/1983 | Yuasa |
| 4,464,054 | 8/1984 | Karras et al. |
| 4,518,258 | 5/1985 | Broersma |
| 4,583,858 | 4/1986 | Lebling et al. |
| 4,635,213 | 1/1987 | Murata et al. |
| 4,653,014 | 3/1987 | Mikami et al. |
| 4,678,338 | 7/1987 | Kitta et al. |
| 4,692,481 | 9/1987 | Kelly |
| 4,707,138 | 11/1987 | Coatney |
| 4,715,715 | 12/1987 | Howarth et al. |

Primary Examiner—David C. Nelms
Assistant Examiner—John R. Lee
Attorney, Agent, or Firm—Henderson & Sturm

[57] ABSTRACT

A color recognition system which illuminates a test surface through the use of a source light and fiber optic cables. The light transmitted to the test surface is reflected into a light pipe and then transmitted through fiber optic cables to a first plurality of color filtered photo detectors. The photo detectors produce quantitative color component values for the tested surface. Light is also transmitted directly from the source light through fiber optic cables to a second plurality of color filtered photo detectors. The second plurality of photo detectors produce quantitative color component values for the light source. The values produced from the first plurality of photo detectors are then adjusted with respect to the values produced from the second plurality of photo detectors.

8 Claims, 2 Drawing Sheets

TRISTIMULUS COLOR RECOGNITION SYSTEM WITH MEANS FOR COMPENSATING FOR VARIATIONS IN LIGHT SOURCE COLOR

TECHNICAL FIELD

This invention relates generally to color recognition systems, and more particularly to the adjustment of the quantitative results of a color recognition system to compensate for any irregularities which may have occurred in the light source during illumination.

BACKGROUND ART

In a color recognition system, it has been conventional to irradiate a test surface with light from a light source, for example as shown in U.S. Pat. No. 4,464,054 to Karras et al., which is incorporated herein by reference. The reflected light from the test surface is directed to a plurality of photo detectors through differently colored filters. In general, three colors of filters, customarily red, green and blue, are used. These three colors make up the color components of the sample. The electrical output from the photo detectors vary with respect to the intensity of each color component in the reflected light and provide a quantitative measurement for each of the color components and therefore a quantitative measurement of color for the test surface.

It is common in the art to calibrate a color recognition system by using a standard tile, or standard test surface. The quantitative value for each color component of the standard tile is known and programmed into the color recognition system. The system is calibrated by initially sampling the standard tile and comparing the sampled color component values to the known standard color component values. Differences between two sets of data establish specific correction factors for each color component. Calibration of future tests with respect to the standard tile are accomplished by using these correction factors.

This technique assumes that the light source illuminates each test surface with light having identical color component characteristics as the light used during calibration. In other words, this technique assumes the light source will flash consistently for each test. However, there may be some variation of the light source from sample to sample. When the light source varies from the standard characteristics used during calibration, the test values must not only be calibrated with respect to the standard tile, but also should be adjusted to compensate for the variation of the light source.

DISCLOSURE OF THE INVENTION

The present invention relates to a color recognition system capable of automatically adjusting the results with respect to variations in the light source in addition to calibration with a standard tile. The color recognition system of the present invention illuminates a test surface through the use of fiber optic cables. The fiber optic cables transmit light from a light source to the test surface. The transmitted light is reflected off the test surface and is directed through a light pipe and fiber optic cables to three differently color filtered photo detectors. Furthermore, the present invention transmits light through the use of fiber optic cables from the source light directly to an additional set of photo detectors. These photo detectors measure the exact characteristics of the light transmitted to the test surface. The electronic signals from all photo detectors are turned into numerical values.

As is common in the art, the present invention calibrates the reflected light values using correction factors obtained during an initial calibration using a standard tile. The reflected light values and the light source values are then transferred from the sensor head to the main computer. The main computer compares the light source values to known values for a standard light source. If any variation is present, the main computer calculates the appropriate differential and adjusts the reflected light values to compensate for the variation.

The adjusted color values can then be stored, printed or compared to other known values. The main computer unit of the present invention is capable of comparing the tested values to an entire library of known color samples to determine which known color is the closest to the sample tested. The main computer unit is likewise capable of determining what color component adjustments are necessary either to adjust the sample to the closest known color or to adjust the closest known color to the sample. In addition, the present invention has a completely removable sensor head capable of storing multiple samples before needing to be returned to the main unit.

An object of the present invention is to provide an improved color recognition system.

Another object of the present invention is to provide a color recognition system which will calculate the exact characteristics of the light source each time a surface is tested.

A further object is to adjust the color measurement of the test surface to compensate for any variation in the characteristics of the light source.

Other objects, advantages, and novel features of the present invention will become apparent from the following detailed description of the invention when considered in conjunction with the accompanying drawings.

BEST MODE FOR CARRYING OUT THE INVENTION

Figure 1:
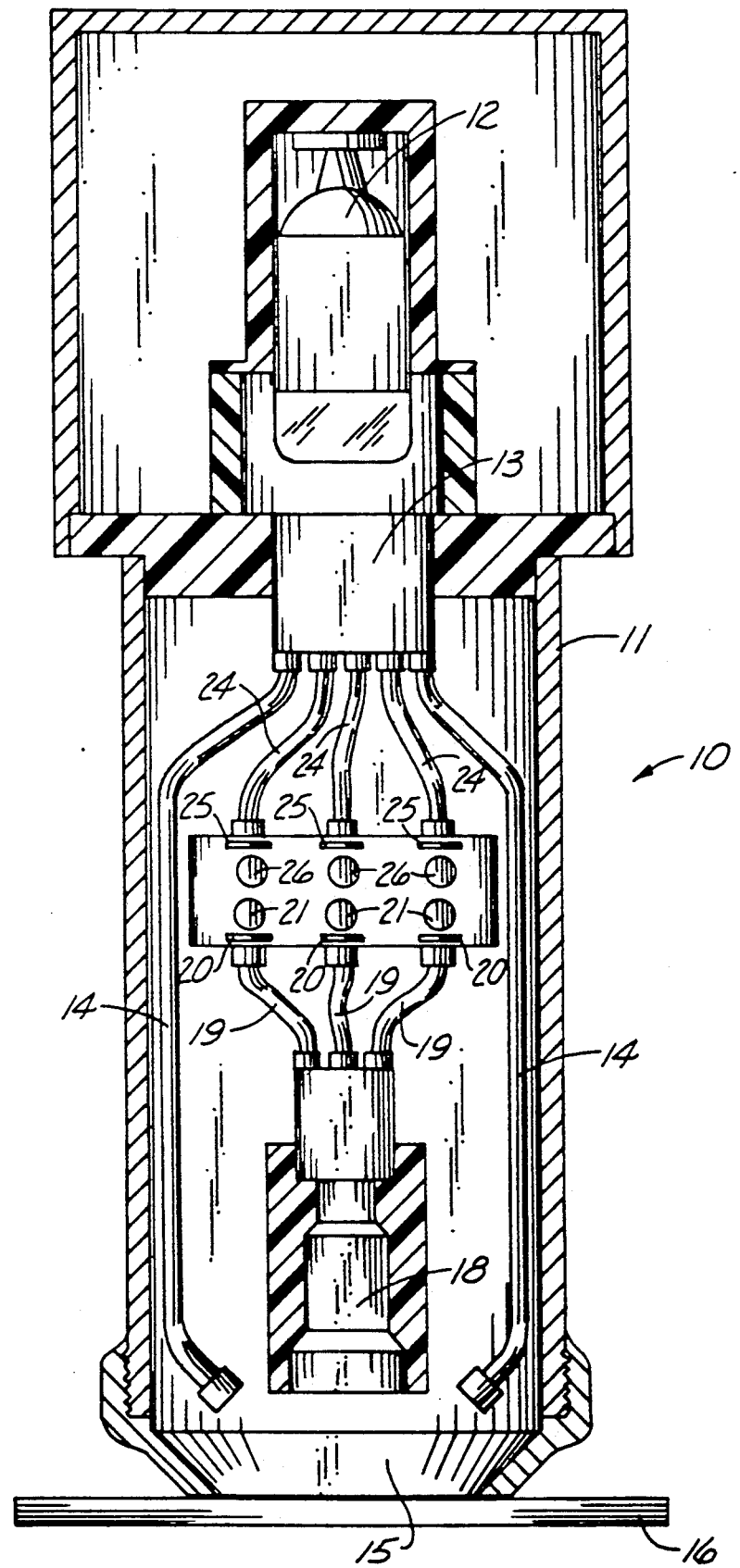
FIG. 1 is a partial cross sectional view of the sensor head.

Referring now to the drawings wherein like reference numerals designate identical or corresponding parts throughout the several views, FIG. 1 shows a sensor head (10) constructed in accordance with the present invention. The sensor head (10) comprises a light-proof housing (11) in which there is mounted a light source (12) arranged to direct light into one end of a light pipe (13). Located in the other end of the light pipe (13) are the receiving ends of two fiber optic cables (14). The two fiber optic cables (14) transmit light from the source light (12) to the illuminating ends of the fiber optic cables (14) which irradiate a test surface (16) located at a measurement plane (15). The light is reflected from the test surface (16) into one end of a light pipe (18). Located at the other end of the light pipe (18) are the receiving ends of three fiber optic cables (19). The light is transmitted through the fiber optic cables (19) to the illuminating ends of the fiber optic cables (19) which directs the light toward three photo detectors (21). Disposed in the path of the light are three color filters (20). Each of the three color filters (20) is of a different color. The three colors used are red, green, and blue. After the light passes through the color filters (20), the color filtered light illuminates one of the corresponding photo detectors (21) which measure the intensity of each of the three colors of light.

Also mounted in the other end of the light pipe (13) which directs light from the light source (12) are the receiving ends of three fiber optic cables (24). Light from the light source (12) is transmitted through the fiber optic cables (24) which direct the light toward three photo detectors (26). Disposed in the path of the light are three color filters (25). Each of the three color filters (25) are differently colored. As before, the three colors are red, green, and blue. After the light passes through the color filters (25), the colored filtered light illuminates one of the corresponding photo detectors (26) which measure the intensity of each of the three colors of light.

Figure 2:
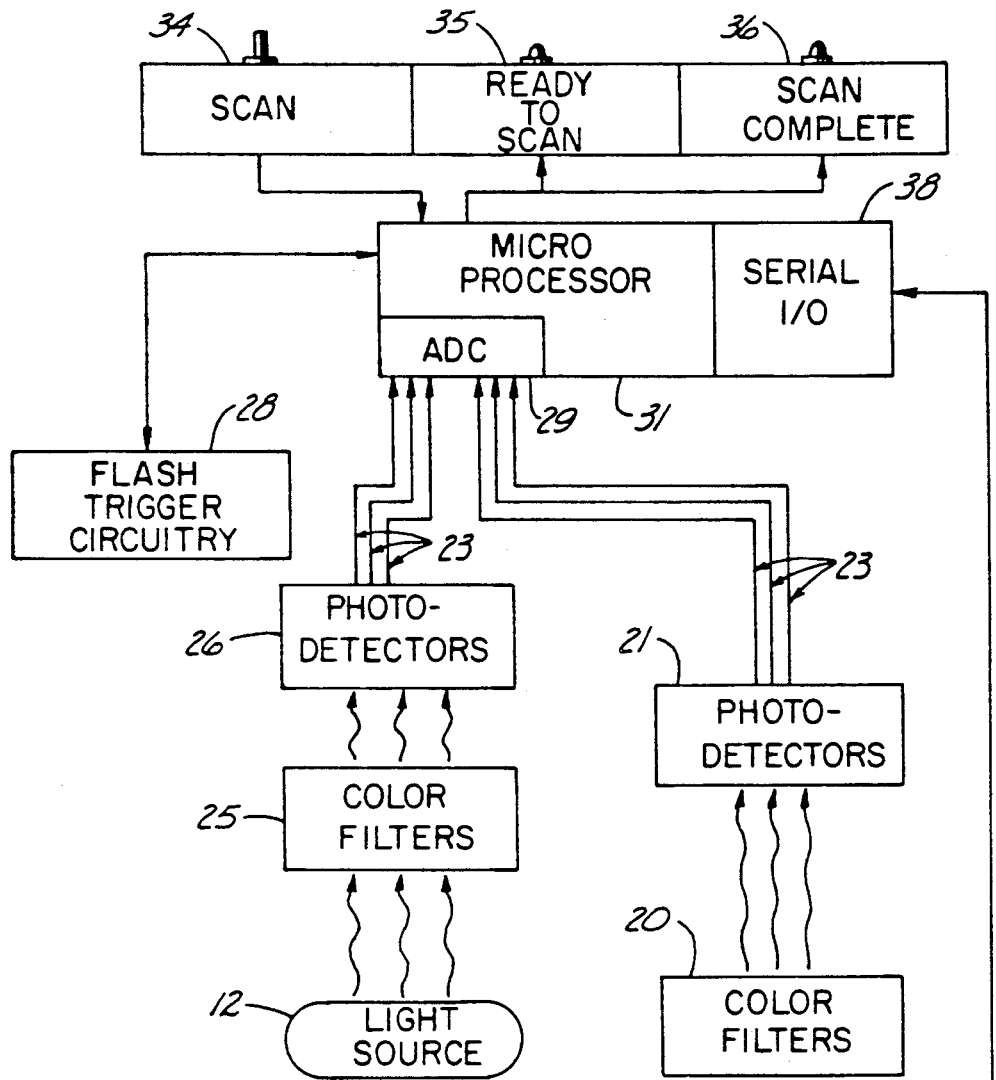
FIG. 2 is a schematic diagram of one embodiment of the sensor head.

Referring now to FIG. 2 which shows a schematic representation of the sensor head (10), the microprocessor (31) controls the operation of the sensor head (10). While the sensor head (10) is not in use and waiting for instructions to scan a test surface, the microprocessor (31) lights a ready to scan signal (35). When a scan is desired, the sensor head (10) must be placed on the test surface and the scan button (34) must be pressed. The microprocessor (31) then shuts off the ready to scan signal (35) and begins a scanning sequence. A scanning sequence begins with the microprocessor (31) signaling to the flash trigger circuitry (28) to activate the light source (12). Light will then be reflected from the test surface and directed to the color filters (20). The colored light from each of the color filters (20) will then be directed to corresponding photo detectors (21) which will measure the intensity of each of the colors of light reflected from the test surface. Light from the light source (12) will also be transmitted directly to color filters (25) and the colored light from each of the color filters (25) will be directed to corresponding photo detectors (26) which will measure the intensity of each of the colors of light from the light source (12).

Figure 3:
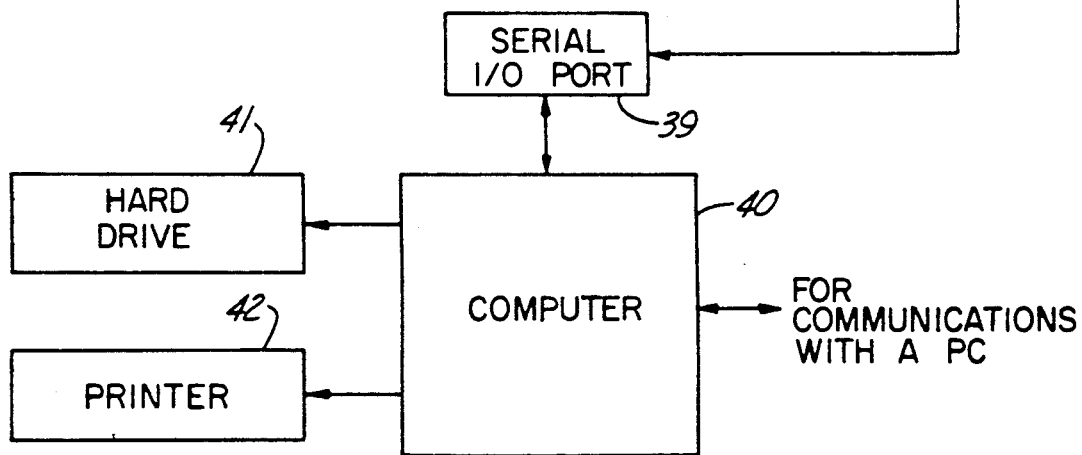
FIG. 3 is a schematic diagram of one embodiment of the main computer unit.

The electronic signals from the photo detectors (21) which measured the reflected light from the test surface and the electronic signals from the photo detectors (26) which measured the light directly from the light source (12) are sent through transmission lines (23) to an Analog-to-Digital Converter (ADC) (29) and are converted into digital values. The microprocessor (31) then calibrates the three values of the reflected light with respect to a standard tile and prepares to send all values to the computer (40), as shown in FIG. 3. When the microprocessor (31) has the digital values ready to transmit to the computer (40), the microprocessor (31) lights the scan complete signal (36). When the scan complete signal (36) is on, the scanning sequence is completed and the sensor head (10) must be connected to the computer (40). This connection is made using the serial I/O port (38) of the sensor head (10) and the serial I/O port (39), as shown in FIG. 3, of the computer (40).

Referring now to FIG. 3, after the computer (40) receives the values from the sensor head (10), the computer (40) compares the values of the light source (12) to known ideal values for the light source (12). If variation between the actual value and ideal value exist, the computer (40) will calculate a differential for each color component. If no variation exists, the differential will be zero. The differentials will then be added (or subtracted if appropriate) to the reflected light values for the test surface. These adjusted values represent the color of the test surface. These values can then be stored on the computer's hard drive (41) or printed out on the printer (42).

Obviously, many modifications and variations of the present invention are possible in light of the above teachings. It is therefore to be understood that, within the scope of the appended claims, the invention may be practiced otherwise than as specifically described.

We claim:

1. A color sensing system, comprising:
   means defining a measurement plane adapted to receive at said measurement plane a test surface for purposes of making a color measurement;
   a light source;
   means for receiving light directly from said light source and transmitting the light to said measurement plane;
   light source red, green, and blue filters associated with light source red, green, and blue photo detectors respectively;
   means for receiving light directly from said light source and transmitting the light to said light source red, green, and blue filters such that the filtered source light is incident on said light source red, green, and blue photo detectors respectively;
   means for determining a first quantitative output from said light source red, green, and blue photo detectors;
   selected light red, green, and blue filters associated with reflected light red, green, and blue photo detectors respectively;
   means for receiving light reflected from said test surface and transmitting the light to said reflected light red, green, and blue filters such that filtered reflected light is incident on said reflected light red, green, and blue photo detectors respectively;
   means for determining a second quantitative output from said reflected light red, green, and blue photo detectors; and
   means for determining a final quantitative output, said final quantitative output being said first quantitative output adjusted with respect to said second quantitative output.

2. A color sensing system of claim 1 wherein said means for determining quantitative outputs comprises a computer.

3. A color sensing system of claim 1 wherein the elements of claim 1 are disposed in one of a main computer unit and a detachable sensing head.

4. A color sensing system of claim 3 wherein said main computer unit includes means for displaying said quantitative outputs.

5. A color sensing system of claim 3 wherein said main computer unit includes means for storing said quantitative outputs.

6. A color recognition system having a light source, a means for illuminating a test surface with light from said light source, a means for transmitting reflected light from said test surface to a first photo detector means, and means for determining numerical outputs for the reflected light from said first photo detector means, the improvement comprising:
   means for transmitting light directly from said light source to a second photo detector means;

means for determining numerical outputs for the light source from said second photo detector means;

means for comparing the numerical outputs for the light source to a known standard value for the light source and calculating a differential; and means for adjusting the reflected light values using the differential to yield an adjusted reflected light value.

7. The color sensing system of claim 6 wherein:

a color filter is disposed in the path of the light transmitted to said first photo detector means; and a color filter is disposed in the path of the light transmitted to said second photo detector means.

8. The color sensing system of claim 6 wherein said first photo detector means includes a first set of at least three photo detectors and a color filter disposed in the path of the light transmitted to each of said first set of photo detectors and wherein said second photo detector means includes a set of at least three photo detectors and a color filter disposed in the path of the light transmitted to each of said second set of photo detectors.

* * * * *